US009904265B2

(12) United States Patent
Schlette et al.

(10) Patent No.: US 9,904,265 B2
(45) Date of Patent: Feb. 27, 2018

(54) SYSTEM FOR PROVIDING AN INDIVIDUALLY CONFIGURED SAFETY SWITCHING RELAY

(71) Applicant: Phoenix Contact GmbH & Co. KG, Blomberg (DE)

(72) Inventors: Steffen Schlette, Bad Oeynhausen (DE); Thomas Huettemeier, Lage (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 285 days.

(21) Appl. No.: 14/441,462

(22) PCT Filed: Nov. 14, 2013

(86) PCT No.: PCT/EP2013/003442
§ 371 (c)(1),
(2) Date: May 7, 2015

(87) PCT Pub. No.: WO2014/079548
PCT Pub. Date: May 30, 2014

(65) Prior Publication Data
US 2015/0293513 A1    Oct. 15, 2015

(30) Foreign Application Priority Data

Nov. 23, 2012  (DE) ........................ 10 2012 022 838

(51) Int. Cl.
*G05B 19/42*    (2006.01)
*G05B 19/042*    (2006.01)
*G05B 19/418*    (2006.01)

(52) U.S. Cl.
CPC ..... *G05B 19/0426* (2013.01); *G05B 19/4183* (2013.01); *G05B 2219/23363* (2013.01);
(Continued)

(58) Field of Classification Search
None
See application file for complete search history.

(56) References Cited

U.S. PATENT DOCUMENTS

| 4,611,380 A * | 9/1986 | Abe ..................... G05B 19/14 |
|---|---|---|
|  |  | 118/323 |
| 2008/0027567 A1 | 1/2008 | Philyaw |
| 2011/0055172 A1 * | 3/2011 | Tan ................... G06F 17/30241 |
|  |  | 707/692 |

FOREIGN PATENT DOCUMENTS

| CN | 101044485 A | 9/2007 |
|---|---|---|
| CN | 201097177 Y | 8/2008 |

(Continued)

OTHER PUBLICATIONS

"International Application No. PCT/EP2013/003442 Translated International Preliminary Report on Patentability", dated Jun. 4, 2015, Publisher: International Bureau of WIPO, Published in: CH.

(Continued)

*Primary Examiner* — Mohammad Ali
*Assistant Examiner* — Sheela S Rao
(74) *Attorney, Agent, or Firm* — Kaplan Breyer Schwarz, LLP

(57) ABSTRACT

A system for providing an individually configured small control system. A list of possible individual configuration settings for configurable small control systems is kept ready in a configuration device and, from the list, by means of the individual selection and combination of individual configuration settings, an individual overall configuration setting of a small control system to be configured is predefined. An optical code is generated based on the predefinition of the individual overall configuration setting, within which code all the necessary data for provisioning the small control system to be configured individually on the basis of the individual overall configuration setting is stored. The optical (Continued)

code is provided to a process control apparatus, which reads and decodes said code and, on the basis of the data stored therein, controls the logistical process as far as the provision of the individually configured small control system based on the individual overall configuration setting.

8 Claims, 2 Drawing Sheets

(52) U.S. Cl.
CPC .............. *G05B 2219/25066* (2013.01); *G05B 2219/31101* (2013.01); *Y02P 90/10* (2015.11)

(56) References Cited

FOREIGN PATENT DOCUMENTS

| CN | 101655918 A | 2/2010 |
|---|---|---|
| CN | 101963804 A | 2/2011 |
| CN | 102200560 A | 9/2011 |
| DE | 102005003254 A1 | 8/2006 |
| DE | 102009042653 A1 | 3/2011 |
| DE | 102009043642 A1 | 3/2011 |
| EP | 2385480 A1 | 11/2011 |
| JP | H0722565 A | 1/1995 |
| WO | 2004092853 A2 | 10/2004 |

OTHER PUBLICATIONS

"International Application No. PCT/EP2013/003442", "International Search Report", dated Feb. 13, 2014, Publisher: International Searching Authority / EPO, Published in: NL.

"German Office Action" issued in parent application No. 10 2012 022 838.4; dated Aug. 6, 2013.

"Office Action" issued in counterpart Chinese Patent Application No. 201380061302.3, dated Aug. 10, 2016, Published in: CN.

* cited by examiner

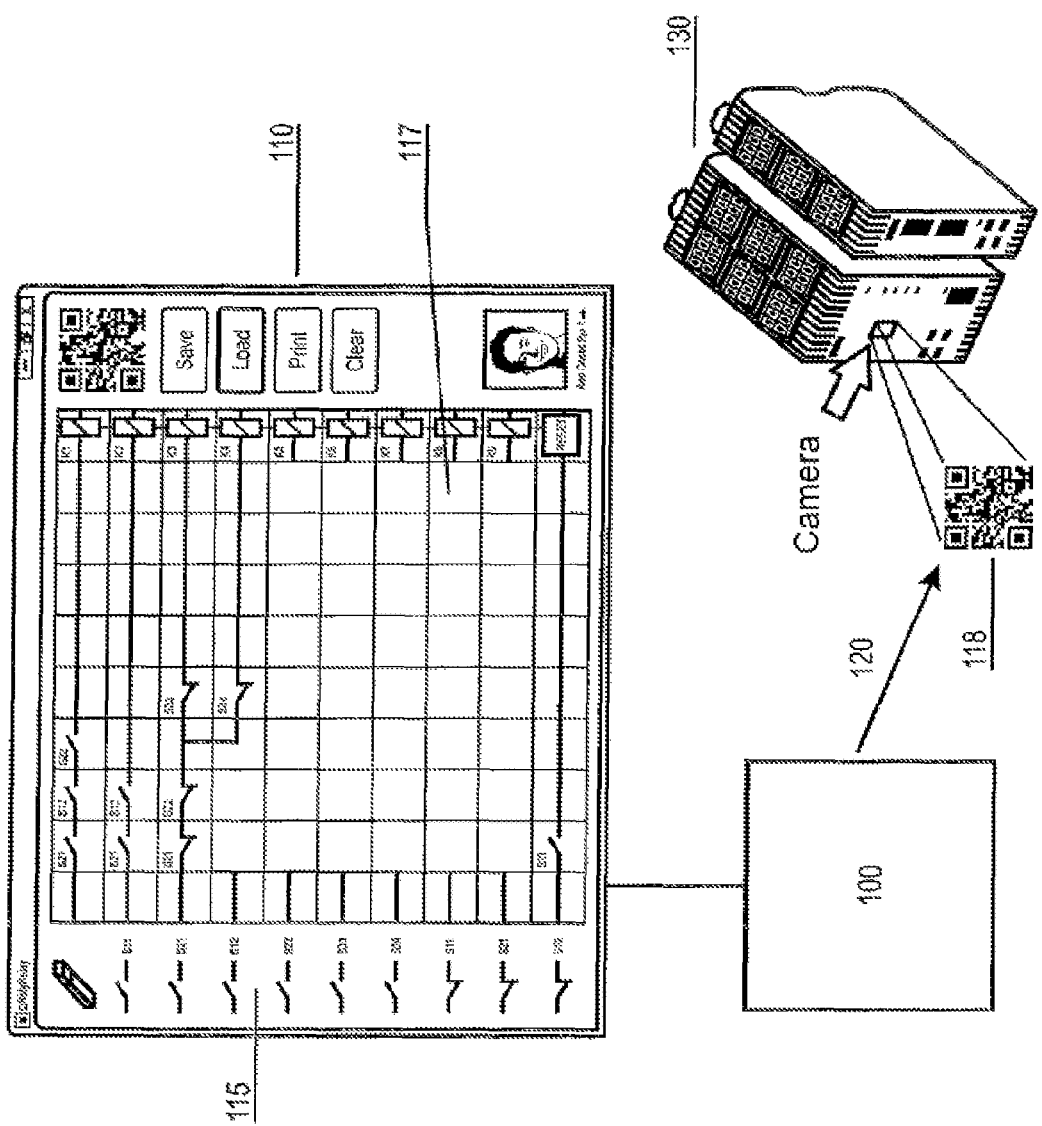

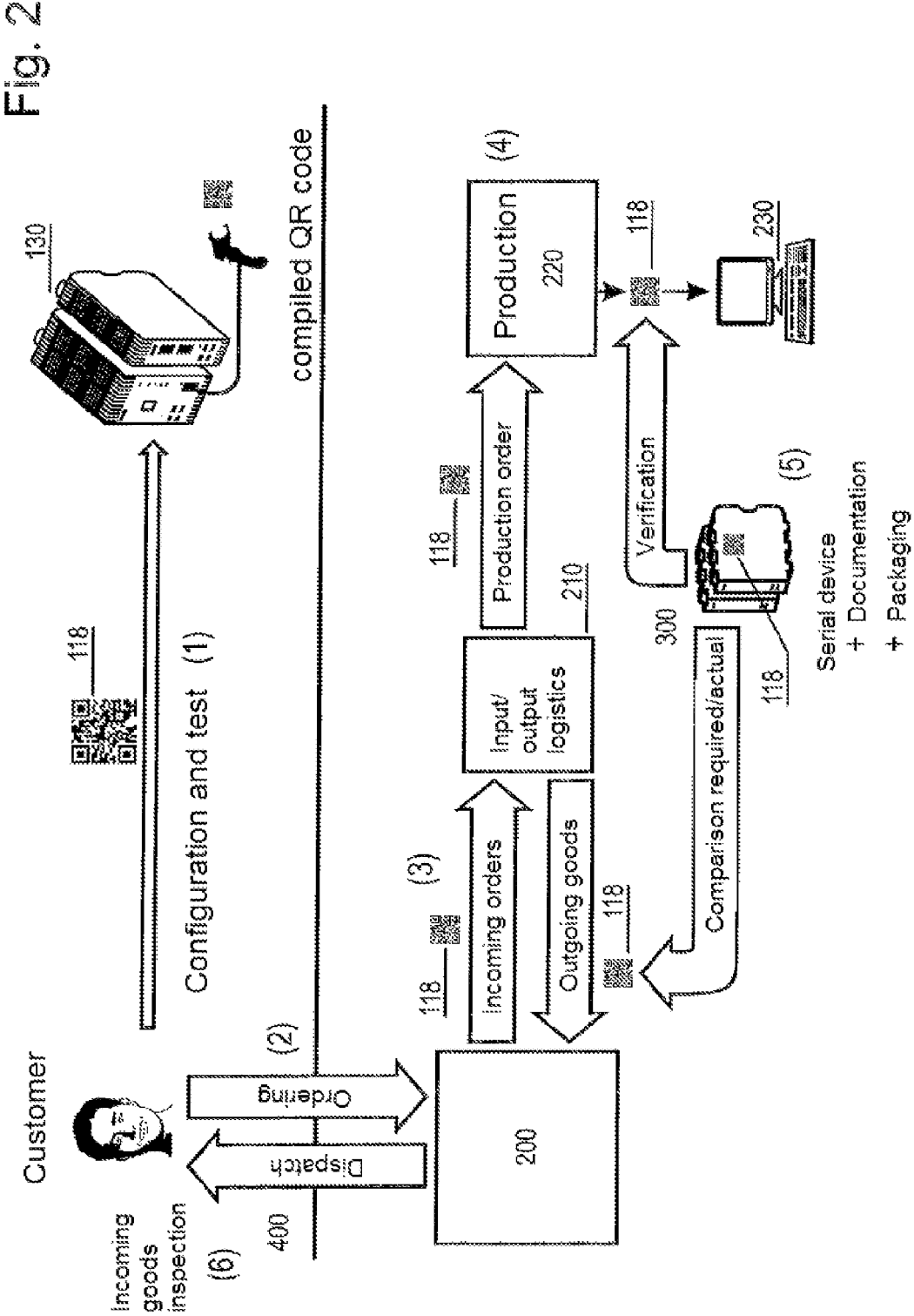

SYSTEM FOR PROVIDING AN INDIVIDUALLY CONFIGURED SAFETY SWITCHING RELAY

FIELD OF THE INVENTION

The invention relates to a system for providing an individually configured small control system, in particular an individually configured safety switching relay.

BACKGROUND OF THE INVENTION

To date, configurations have been loaded into configurable small control systems, in particular configurable safety switching relays, as a rule by means of software. The loading of the configuration by means of software is carried out for example via an RS232/USB connection or an Ethernet connection and is tied to a PC. The loaded configuration is mostly stored onto a storage medium that can be installed in a replaceable manner into the configurable small control system or directly into an integrated store of the configurable small control system. Moreover, if the configuration is carried out using a display, the menu structure is frequently complex and confusing.

By contrast, a method is known for example from EP 2 385 480 A1, in which data that is needed by a communication device for network access, is stored in an optical code, for example a barcode or a QR code. The communications device reads the code in by means of a camera in order to obtain network access, and decodes the data contained therein, which subsequently effects a configuration of the communications device for obtaining network access for the communications device itself.

However, carrying out such a self-configuration for a certain network access already requires a communication device with correspondingly preconfigured intelligent units, in particular a preconfigured decoder and processor, which are already capable of carrying out the appropriate processing of the data contained in the read-in optical code.

Further, methods for equipping substrates with components and/or for equipping printed circuit boards are known from DE 10 2009 042 653 A1 and DE 10 2009 043 642 A1.

SUMMARY OF THE DISCLOSURE

Each substrate to be equipped or each printed circuit board to be equipped includes here an individual identifier in the form of an optical code. On the basis of this identifier, which is read in by an assembly machine, an individual assembly variant is determined by means of deposited lists containing possible assembly variants and configurations, and is provided to an assembly program. In this connection, defined associations always have to be provided here between the identifiers contained in optical codes to be read in and the assembly variants predefined in deposited lists, which moreover have to be accessible to the assembly machine, in order to actually determine and process in each case an individual assembly variant.

It is thus an object of the invention to provide an approach for configuring a configurable small control system, in particular a configurable safety switching relay, by means of which a respective individual configuration can be predefined for a specific application in an extremely flexible manner, and substantially merely on the basis of this, the application-specific individual configurations of the small control system may be carried out.

Accordingly, the invention provides for the application-specific individual configuration of a small control system, in particular a safety switching relay, preferably a system for providing an individually configured small control system, in particular an individually configured safety switching relay, wherein a list of possible individual configuration settings for configurable small control systems is pre-stored in a configuration device, and by means of an individual selection and compilation of individual configuration setups, an individual overall configuration setting of a small control system to be configured is predefined from the list of possible individual configuration settings pre-stored in the configuration device, an optical code is generated on the basis of the specification of the individual overall configuration setting, within which all the necessary data for providing the small control system to be individually configured is deposited on the individual overall configuration setting, the optical code is provided to a process control unit, which reads it in and decodes it and, based on the data deposited therein, controls the logistic process up to the provision of the individually configured small control system on the basis of the individual overall configuration setting.

Essential advantages are therefore that no centrally deposited lists are necessary any more that would have to be accessed during the control of the logistic processes for providing a configured small control system, the individual process steps can also be carried out decentrally and the configuration of each small control system can still be predefined individually and in an application-specific manner from the onset.

Thus, it is for example provided that the process control unit selects, on the basis of the data deposited in the optical code, the process devices that have to be involved in the logistic process up to the provision of the individually configured small control system, and the optical code is provided to the selected process devices under the control of the process control device, wherein each process device, having the optical code provided thereto, reads in and decodes said optical code and executes in accordance with the data deposited therein a respective sub-process processing program deposited in the processing device, wherein the execution of the sub-process processing program by the selected process devices is coordinated under the control of the process control device, and the individually configured small control system is provided to the selected process devices by executing all of the sub-process processing programs.

Thus, preferably all the technical information, including hardware configurations, software configurations and the functionality of the small device to be individually configured, as well as expediently further relevant customer data of the small device to be individually configured, are deposited in the generated optical code.

It has also proven to be expedient if the optical code is attached to the individually configured small control system, so that it can be used to carry out a comparison of the desired and the actual configuration by means of a corresponding process device in a simple manner.

It is further expedient if the configuration device has associated therewith a simulation device having provided thereto the optical code prior to the transmission to the process control unit, and which reads in and decodes the optical code and tests, on the basis of the data deposited therein, the functionality of the small control system to be individually configured by way of simulation of the individual overall configuration setting.

The simulation device internally or externally associated with the configuration device is further preferably designed to indicate to the configuration unit, on the basis of the data deposited in the optical code and after subsequent simulation of the individual overall configuration setting, a fault-free functionality of the small control system to be individually configured, so that on the basis of this the configuration unit provides the optical code to the process control device, or to indicate to the configuration unit a faulty functionality of the small control system to be individually configured, so that on the basis of this the configuration device indicates a required change to the individual selection and compilation of individual configuration settings for predefining a new individual overall configuration setting.

The configuration device is further preferably designed to add to the corresponding optical code, once a fault-free functionality indication has been indicated to the simulation unit, a check identifier which, together with the optical code, is provided to the process control device, wherein the check identifier added to the optical code is expediently also attached to the individually configured small control system.

BRIEF DESCRIPTION OF THE DRAWINGS

Further advantages and features of the invention will become evident from the subsequent description of exemplary embodiments of the invention with reference to the attached drawings, wherein:

FIG. 1 shows an exemplary configuration device according to the invention with a user interface and associated simulation device in a schematic form, and FIG. 2 shows individual, exemplary process sections which are carried out under the control of a process control unit on the basis of the data deposited in the optical code of various process devices to be involved in the logistic process up to the provision of an individually configured small control system by executing respective sub-process processing programs.

DETAILED DESCRIPTION

The invention will be described in more detail below with reference to FIGS. 1 and 2 by means of exemplary embodiments of a preferred system according to the invention for providing an individually configured small control system, in particular an individually configured safety switching relay.

Reference numeral 100 identifies a configuration device that is shown in a schematic form and has a user interface 110.

In the configuration device, a list of possible individual configuration settings for configurable small control systems is pre-stored in a list that is not shown in the figures. Via the user interface 110, an individual overall configuration setting 117 of a small control system to be configured can be predefined by way of individually selecting and compiling individual configuration settings 115.

On the basis of the predefinition of the individual overall configuration setting, the configuration device generates an optical code 118, in the present example a QR code, wherein in principle also any other optical code, such as for example a barcode, may be generated depending on the particular embodiment, within which all the necessary data for providing the small control system to be individually configured is deposited on the basis of the individual overall configuration setting.

Since the way of generating the optical code is not essential to the invention and various coding methods per se known to a person skilled in the art are known for such a generation, the generation will not be addressed in any more detail. What is essential is merely that the optical code, depending on the volume of the data to be deposited herein, is sufficient, which may be influenced both via the type and the size of the code and via the coding method.

Within the scope of the invention, the type and size and/or the coding method are expediently selected such that in the generated optical code, all the technical information, including hardware configurations, software configurations and the functionality of the small control system to be individually configured can be deposited, as well as preferably any relevant customer data of the small control system to be individually configured. All of this data may be input, including selected and compiled, either via a user interface 110 as schematically shown in FIG. 1 and/or via another one.

Any change to the configuration thus creates its own individual optical code.

The configuration device has preferably associated therewith a simulation device which may also be part of the configuration device. In the example shown in FIG. 1, a simulation device 130 is provided externally of the configuration device. The simulation device is further expediently designed in such a way that it can simulate the maximum setup of small control systems to be configured, and can in this context expediently take into account all the possible individual configuration settings for configurable small control systems that are deposited in the list in the configuration unit. Since the system according to the invention is in particular adapted for providing an individually configured safety switching relay, the simulation device is depicted in a way similar to such a relay.

The generated optical code 118 is provided by using an associated simulation unit 130, preferably prior to the transmission to a process control unit 200 for controlling a logistic process up to the provision 120 of the individually configured small control system on the basis of the individual overall configuration setting of the simulation unit 130.

The provision 120 is here preferably carried out by means of a visual indication of the code, whereupon the simulation device reads in this code by means of a camera or a scanner and then decodes it by means of a decoder unit. However, in principle also other types such as a wireless or wired transmission of the code are possible, wherein to this end the optical code first of all has to be correspondingly converted for such a transmission. However, since within the context of the invention the optical code is expediently, as described below, preferably attached to a respective individually configured small control system, the code is converted back into the optical code after such a transmission and is indicated as such to the simulation device, and the simulation device can expediently check said code at least for plausibility as early as during the reading-in and decoding of the optical code.

However, in any case the simulation device 130 is designed in such a way that it tests, on the basis of the data deposited in the optical code, the functionality of the small control system to be individually configured by way of simulating the individual overall configuration setting.

Preferably, the simulation device 130 further indicates to the configuration device 100, on the basis of the data deposited in the optical code and of the simulation of the individual overall configuration setting carried out, that either a fault-free functionality of the small control system to be individually configured is present or that a faulty functionality of the small control system to be individually configured is present. In the former case, the configuration device 100 preferably provides the optical code to the process control unit 200, and in the latter case, the configuration unit 100 preferably indicates that a change to the individual selection and compilation of individual configuration settings is necessary for predefining a new individual overall configuration setting.

In any case, the optical code is provided, once it has been generated on the basis of the final completion of the individual overall configuration setting, and as described above, preferably after successful verification thereof by way of a test using the simulation device 130, is subsequently provided by the configuration unit to the process control device 200, which reads in and decodes the code and controls, on the basis of the data deposited therein, the logistic process up to the provision of the individually configured small control system on the basis of the individual overall configuration setting. These and the subsequent further provisions, like the one described above, are also carried out in relation to the transfer from the configuration device to the simulation device.

Expediently, provided a successful verification has been carried out using the simulation device, a check identifier is further added by the configuration device 100 to the corresponding optical code 118, once a fault-free functionality has been indicated to the simulation device, which identifier together with the optical code is provided to the process control unit 200, which depending on the version of the system is deposited in the optical code or is provided to the process control unit 200 separately from the optical code. This will then also be attached to a respective individually configured small control system, as will be described below.

Once the process control unit 200 has read in and decoded the optical code 118, the latter further preferably selects, for controlling the logistic process, the process devices 210, 220, 230 on the basis of the data deposited in the optical code 118, which are to be involved in the logistic process up to the provision of the individually configured small control system 300. Subsequently, the optical code 118 is provided to the selected process devices 210, 220 and 230 under the control of the process control unit and each process device 210, 220 or 230, which has the optical code 118 provided thereto, reads in and decodes the latter and executes in correspondence with the data deposited therein a respective sub-process processing program deposited in the process device 210, 220 or 230. The execution of the sub-process processing program is coordinated by the selected process devices 210, 220 and 230 under the control of the process control device 200, wherein for example the process devices are instructed by the process control device 200 not to provide the code to the process device immediately following the logistic process until after the respective own sub-process processing program has been executed. The individually configured small control system is consequently provided to the selected process devices by executing all of the sub-process processing programs.

A preferred process that can be carried out by means of the system as described above which has been expediently designed, accordingly runs as briefly outlined. For configuration and test purposes, a simulation device is provided as an engineering device. This device includes the maximum setup of possible small control systems offered by a manufacturer, in particular of internally possible relays of available security switching relays.

The hardware variants of such a security switching relay consist for example of different types (single channel or dual channel) and numbers of security-relevant relay contacts as well as the type and the number of security-relevant input signals.

In a first process step, identified with (1) in FIG. 2, the user carries out the desired configuration of the hardware as well as the individual software configuration by means of the configuration device, and on the basis of this configuration an optical code is generated, which means it is "deposited" as an optical code, in particular as a QR code. Subsequently, therefore, reference is only made to a QR code. Any change to the configuration generates its own individual QR code. This QR code 118 can be used to read the configuration into a simulation device 130, which is also a component of the configuration device, via a module, preferably for example a camera or a scanner, which is an internal or external component of the configuration device. In this way, the functionality on a simulated machine/equipment can be verified in a security-related manner under real-world conditions.

Once the final hardware and software configuration has been carried out by the user, the QR code is provided to the process control device 200 in a further process step, identified with (2) in FIG. 2, which triggers the ordering process by means of the QR code 118 thus generated and preferably an additional check number. The QR code 118 thus expediently includes all the technical information such as hardware configuration, software configuration and functionality as well as preferably any relevant customer data.

Once the ordering process has been triggered, the customer order, which expediently includes information in relation to delivery times, quantities, discounts, prices etc., is linked, by the process control device 200 with the technically functional product properties described by the QR code 118 in a further process step referred to with (3) in FIG. 2. From this moment onwards, the logistic processes can be internally controlled and the production order can be initiated and the QR code 118 is successively transferred to the respectively following process devices 210.

At the end of the production chain, the merging of the pre-fabricated hardware with the customized software configuration (firmware) with terminating functional tests is carried out using the corresponding process devices 220 in a further process step, identified with (4) in FIG. 2.

For identification, the QR code is attached to the housing of the individually configured security switching relay 300, in a preferred case including the check number.

In a further step, identified with (5) in FIG. 2, packaging of the device with the required documentation is subsequently carried out. No later than at this point, verification against the required configuration is carried out in this process step by means of an appropriately designed process device 230.

After a successful final check, the individually configured security switching relay 300 is dispatched, and on the customer side, identified with (6) in FIG. 2, an incoming goods inspection can be carried out by means of a control device 400 using the check number attached to the device.

Whilst in the prior art so far the provision of small control systems, in particular of security switching relays, can be classified into a) classical security switching relays with a fixed functionality specified by the manufacturer, and b) configurable security switching relays, wherein the user uses a hardware platform specified by the manufacturer and specifically determines the configuration by means of a software tool, the invention moreover also allows to offer a security switching relay that can be individually configured by the customer, including its internal function. This means that the customer can compile their own security function(s) which will correspond exactly to their requirements. To this end, the user can use the configuration device 100 as a software tool, by means of which the hardware to be configured, including the software functionality is defined.

In this production, which can also be referred to as "hard customization", individualization is carried out by the manufacturer within the production process. This is thus preferably carried out by means of a standardized pre-production of the hardware with customer-specific firmware. The customer cannot make any changes retrospectively.

In this case, the software interface, which is not shown in any more detail and which can be operated by means of the user interface 110, will generate in this case, depending on the wiring or configuration done by the user, an optical code, for example a barcode or a QR code. To this end, the configuration unit may be available offline on various operating systems such as PC, Mac, iOS, Android, or online, e.g. via an eShop or a home page. The user can thus send the generated optical code to the manufacturer online or e.g. by telefax, and the code contains in these cases the configuration made by the user and is expediently additionally secured, e.g. by using a CRC (Cyclic Redundancy Check) additionally deposited in the optical code. During the manufacturing process, the optical code can then be used in order to produce customized devices.

What is claimed is:

1. A system for providing an individually configured small control, the system comprising:
    a configuration device pre-storing a list of possible individual configuration settings for configurable small controls, wherein an individual overall configuration setting of a small control to be configured is predefined from a list of possible individual configuration settings as predefined in the configuration device by an individual selection and compilation of individual configuration setups,
    an optical code generated on a basis of the predefinition of the individual overall configuration setting, wherein within the optical code all necessary data for providing the small control to be individually configured is deposited on a basis of the individual overall configuration setting,
    a process control device, which reads in and decodes the optical code and controls, on a basis of the data deposited therein, a logistic process up to the provision of the individually configured small control on the basis of the individual overall configuration setting,
    wherein the process control device selects, on the basis of the data deposited in the optical code, process devices that are to be involved in the logistic process up to the provision of the individually configured small control,
    wherein the optical code is provided to the selected process devices under the control of the process control device,
    wherein each process device that has the optical code provided thereto, reads in and decodes the latter and executes, in correspondence with the data deposited therein, a respective sub-process processing program deposited in the process device, and
    wherein the execution of the sub-process processing programs is coordinated by the selected process devices under the control of the process control device, and the individually configured small control is provided to the selected process devices by executing all of the sub-process processing programs of the selected process devices.

2. The system as claimed in claim 1, wherein in the generated optical code, all technical information, including hardware configurations, software configurations and functionality of the small control to be individually configured are deposited.

3. The system as claimed in claim 2, wherein any relevant customer data of the small control to be individually configured is deposited in the generated optical code.

4. The system as claimed in claim 1, wherein the optical code is attached to the individually configured small control.

5. The system as claimed in claim 1, wherein the configuration device has associated therewith a simulation device, to which the optical control is provided prior to the transmission to the process control unit, and which reads in and decodes said code and tests, on the basis of the data deposited therein, the functionality of the small control to be individually configured by way of simulating the individual overall configuration setting.

6. The system as claimed in claim 5, wherein the simulation device, on the basis of the data deposited in the optical code and the simulation of the individual overall configuration setting carried out, either indicates to the configuration device a fault-free functionality of the small control to be individually configured, and the configuration device provides, on the basis thereof, the optical code to the process control unit, or indicates to the configuration device a faulty functionality of the individual small control to be individually configured, and the configuration device indicates on this basis any necessary changes to the individual selection and compilation of individual configuration settings for predefining a new individual overall configuration setting.

7. The system as claimed in claim 6, wherein the configuration device adds, once a fault-free functionality has been indicated to the simulation unit, a check identifier to the corresponding optical code, which together with the optical code is provided to the process control unit.

8. The system as claimed in claim 7, wherein the check identifier added to the optical code is attached to the individually configured small control.

* * * * *